(12) United States Patent
Lester et al.

(10) Patent No.: US 6,522,724 B2
(45) Date of Patent: *Feb. 18, 2003

(54) APPARATUS AND METHOD THAT ALLOW TELEPHONE CALLERS TO LEAVE LONGER MESSAGES

(75) Inventors: Leland Lester, Austin, TX (US); David Iglehart, Austin, TX (US); Kevin M. Raper, Austin, TX (US)

(73) Assignee: Siemens Information and Communication Networks, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,572

(22) Filed: Jan. 20, 1998

(65) Prior Publication Data

US 2001/0012334 A1 Aug. 9, 2001

(51) Int. Cl.[7] .............................. H04M 1/64; H04M 3/42
(52) U.S. Cl. ............................ 379/67.1; 379/68; 379/75; 379/85; 379/88.22; 379/88.25; 379/88.26; 379/88.17; 379/88.18; 379/201.01
(58) Field of Search .......................... 379/67.1, 68, 76, 379/83, 88.04, 88.09, 88.1, 88.22, 88.23, 88.25, 88.26, 88.27, 88.28, 75, 88.13, 93.24, 85, 100.01, 100.02, 100.03, 88.17, 900, 902, 905, 908

(56) References Cited

U.S. PATENT DOCUMENTS

| | | | | | |
|---|---|---|---|---|---|
| 3,935,390 | A | * | 1/1976 | Winterhalter | 379/67.1 |
| 4,481,382 | A | * | 11/1984 | Villa-Real | 455/556 |
| 4,757,525 | A | * | 7/1988 | Matthews et al. | 379/88 |
| 5,394,445 | A | * | 2/1995 | Ball et al. | 379/67 |
| 5,457,738 | A | * | 10/1995 | Sylvan | 379/96 |
| 5,488,409 | A | * | 1/1996 | Yuen et al. | 348/5 |
| 5,497,183 | A | * | 3/1996 | Yoshida et al. | 347/215 |
| 5,509,061 | A | * | 4/1996 | Amereller et al. | 379/207 |
| 5,555,289 | A | * | 9/1996 | Hashimoto | 379/67 |
| 5,692,213 | A | * | 11/1997 | Goldberg et al. | 395/806 |
| 5,742,905 | A | * | 4/1998 | Pepe et al. | 455/461 |
| 5,926,526 | A | * | 7/1999 | Raoaport et al. | 379/88.25 |
| 6,067,516 | A | * | 5/2000 | Levay et al. | 704/244 |
| 6,087,956 | A | * | 7/2000 | Helferich | 340/825.44 |

* cited by examiner

Primary Examiner—Allan Hoosain

(57) ABSTRACT

A messaging system allows a message recipient to assign different message lengths to different messages. In one embodiment, the recipient sets the length of time per message. In another embodiment, the recipient programs the messaging system with codes that, when matched, enable longer messages. The recipient assigns the codes to "preferred" senders. The senders transmit the code, either explicitly, for example by a sequence of keystrokes, or automatically, for example by transmitting caller identification.

17 Claims, 8 Drawing Sheets

APPARATUS AND METHOD THAT ALLOW TELEPHONE CALLERS TO LEAVE LONGER MESSAGES

BACKGROUND OF THE INVENTION

Telephone voice message systems such as PHONEMAIL (™) and telephone answering machines have become an omnipresent feature of modern life. Many people receive and send several messages by voice message systems every day.

Most voice message systems have a limited recording time for a caller to leave a message. When the recording time is exceeded, many systems cut off the caller without a warning; this can break the caller's concentration. The caller then must place the call again. Since it may not be clear exactly when he was cut off, he may have to backtrack or summarize his previous message.

Some systems warn the caller that the message recording time is about to end. While this is an improvement over the sudden cut-off, such a system nonetheless interrupts the caller and can interfere with his concentration. He may then rush the remainder of his message, which can lead to misstatements. In any event, the "warning time" is often not long enough, in which case the caller must place the call again, with the disadvantages just described in the last example. In either case, the fragmentation and repetitiveness of the message process is often irritating to both the caller and the call recipient.

Some systems allow longer messages to be recorded. However, memory is expensive, and allowing callers to leave long messages can be costly. Furthermore, long messages left by unwanted callers such as telephone solicitors must then be dealt with. Since total recording time is limited, such calls may end up restricting the recording time or number of wanted or important calls.

In any event, message recording systems have a finite capacity. What is needed is a system that limits the available message time for unwanted calls without forcing important messages to become shortened, disjointed, or repetitive.

SUMMARY OF THE INVENTION

A code can be entered into the keypad that allows a caller to extend the time allotted for messages. In one variation, a hierarchy of codes can provide for different time limits for different incoming callers in accordance with previously assigned allotments. The codes can be input by the caller or can be assigned by the system after the system recognizes the caller. In another variation, the call recipient can set the message time allotment per call.

DESCRIPTION OF THE PREFERRED EMBODIMENTS

Figure 1:
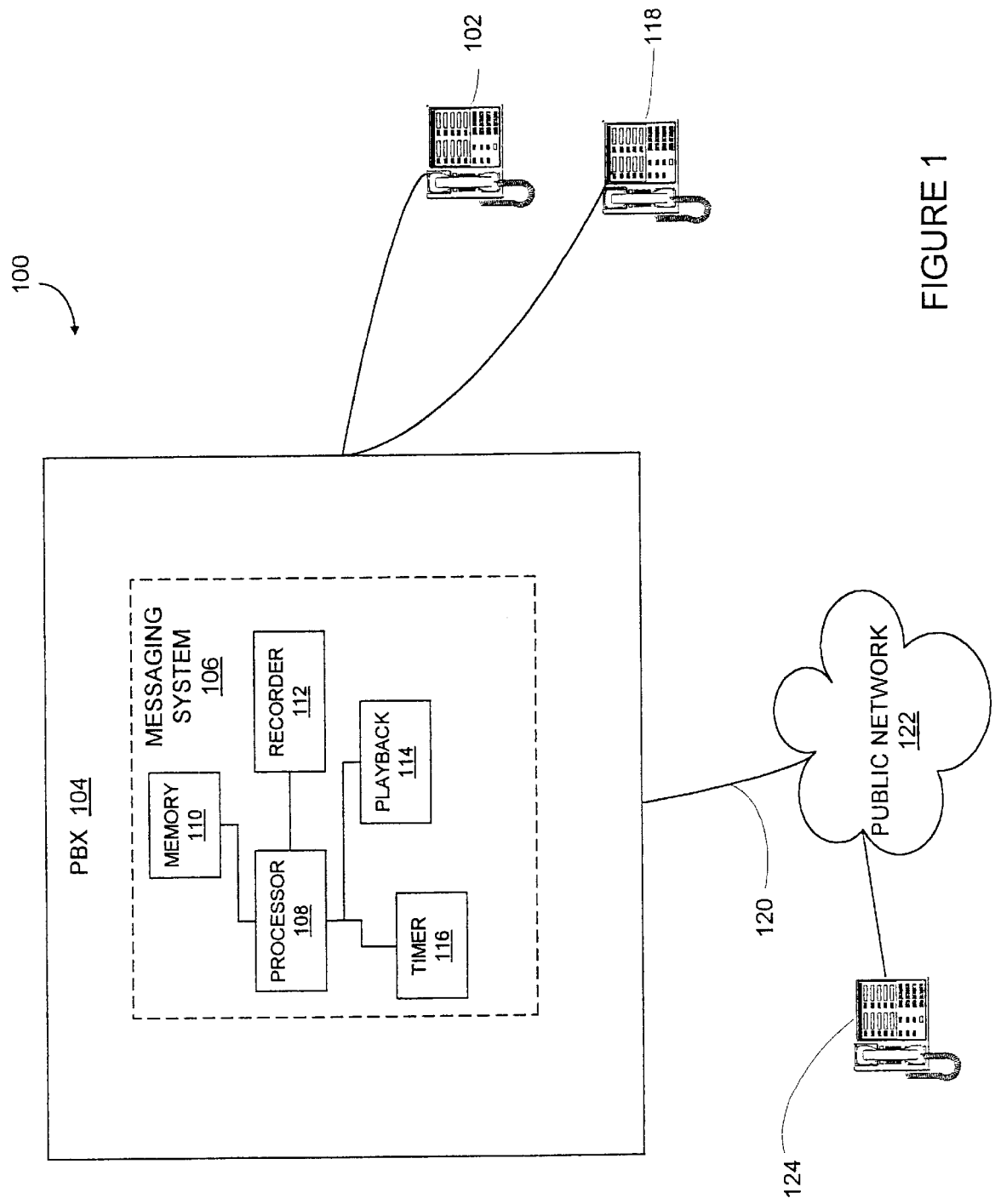
FIG. 1 depicts a PBX messaging system in accordance with the present invention.

A telephone messaging system 100 in accordance with the present invention comprises a local telephone 102 connected to a private branch exchange (PBX) 104. PBX 104 includes a messaging system 106 that includes a processor 108, a memory 110, a recorder 112, a playback system 114, and a timer 116. As is well known in the art, system 106 also includes control and interface mechanisms, not shown in FIG. 1. A second telephone 118 is also connected to PBX 104. PBX 104 connects, via a telephone line 120, to public network 122, which connects to remote telephones such as telephone 124.

An incoming caller places a call on telephone 124 to, for example, local telephone 102. If telephone 102 is not answered within a certain number of rings, messaging system 106 handles the call. After a prerecorded or preselected message is played to the caller, recorder 112 records the caller's message.

Recorder 112 contains a finite amount of recordable time. In the preferred embodiment, the total amount of recordable time is divided into time segments, with each segment recording one call. If the caller nears the end of a segment, the messaging system signals the caller that time is about to run out, and inquires whether the caller would like more time.

If the caller would like more time, he enters a code by pressing a preselected sequence of one or more dual-tone multiple frequency (DTMF) keys on the keypad of telephone 124. In one embodiment, the system cues the caller, as for example instructing him to press the pound key if more time is needed. In alternatives, preferred callers have assigned codes, such as a sequence of keystrokes, that must be recognized by the processor before more time is granted. The code is recognized by checking against previously entered codes stored in memory 110. Alternatively, the response may be given by other means, such as a voice response recognized by voice-recognition software within processor 108. If the code is correctly entered, additional time is allotted for recording the message.

Figure 2:
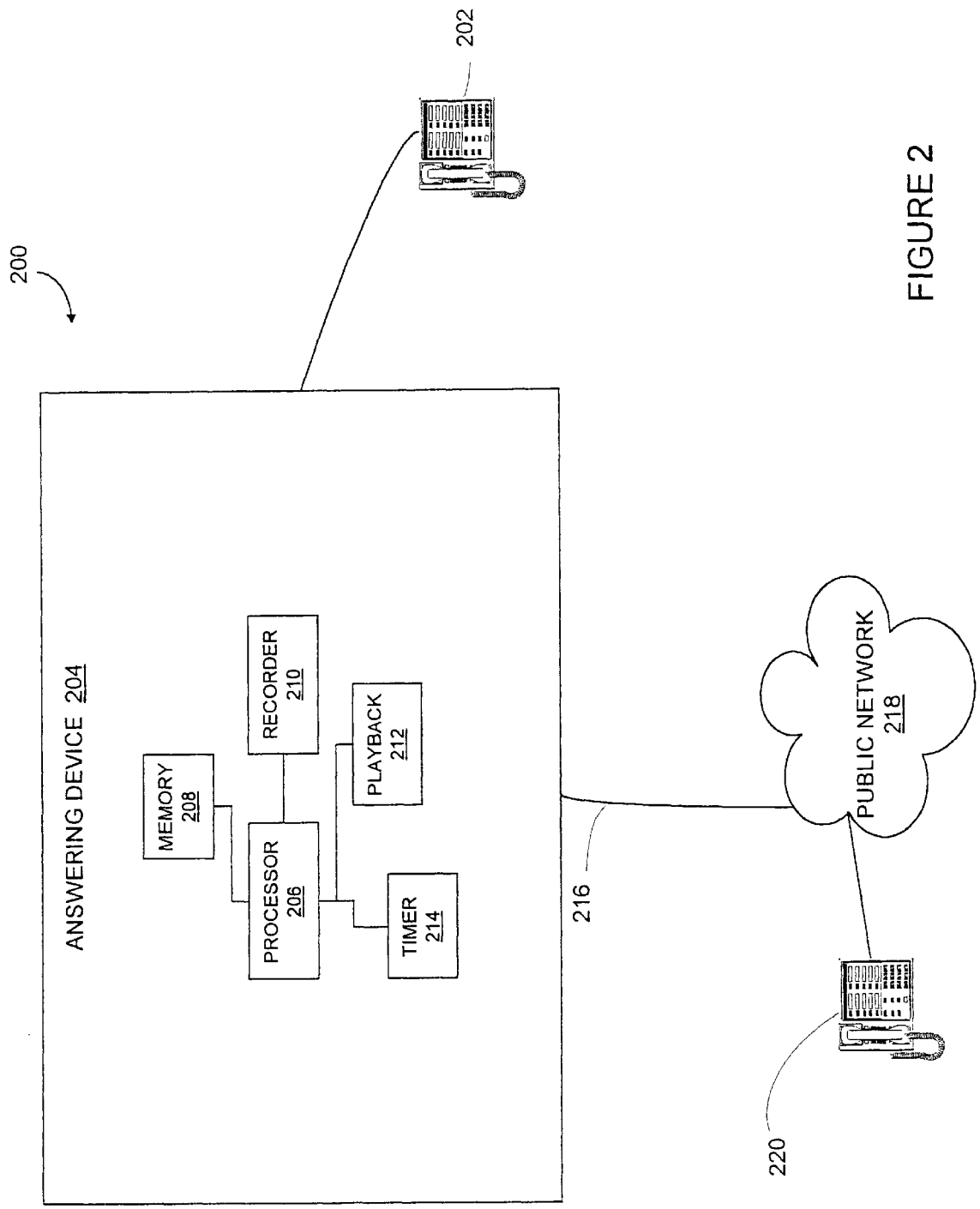
FIG. 2 depicts a telephone answering device in accordance with the present invention.
Figure 3:
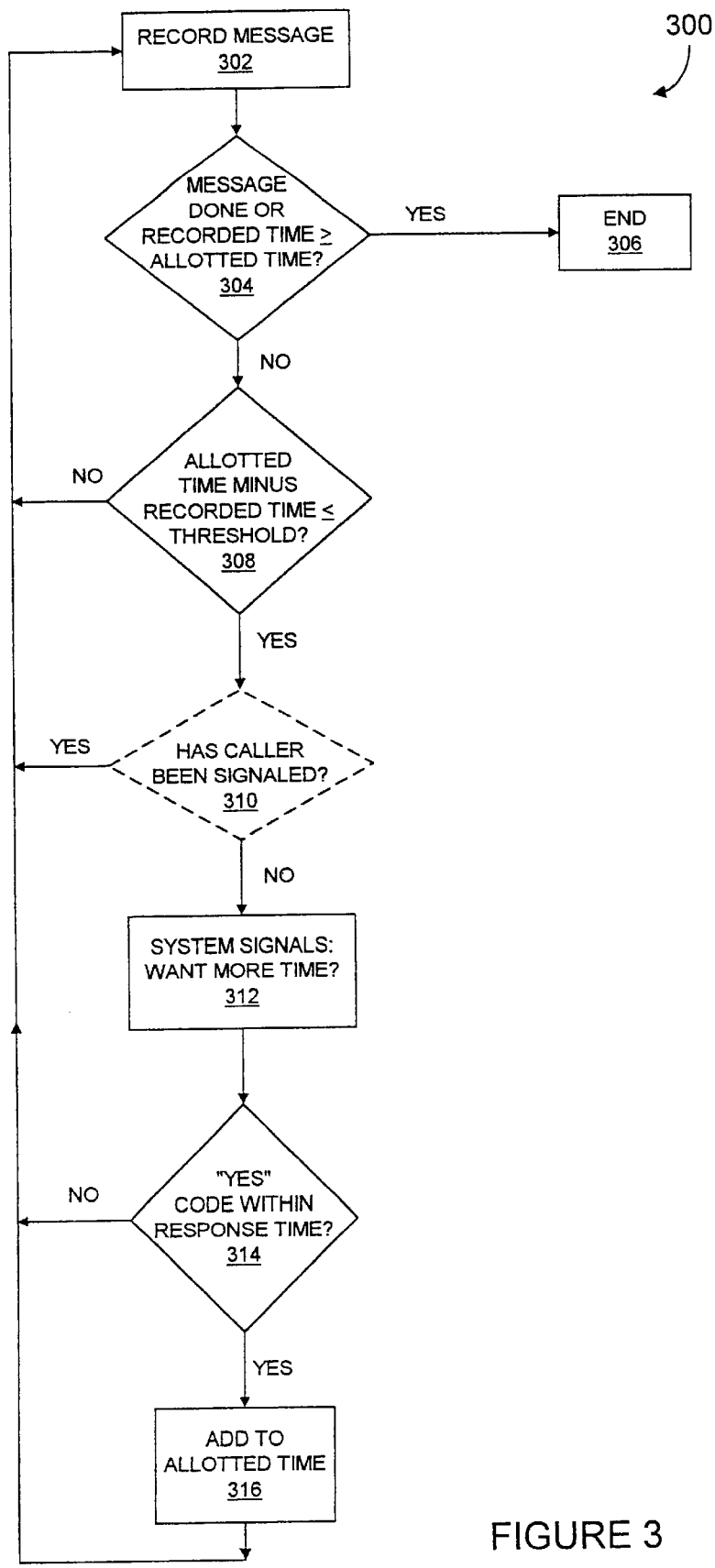
FIG. 3 shows steps of a method in accordance with the present invention.

FIG. 2 shows a telephone answering device implementation of the present invention. A method 200 in accordance with the present invention is shown in FIG. 2. A telephone 202 is connected to a telephone answering device 204. Answering device 204 includes a processor 206, a memory 208, a recorder 210, a digital prompt playback 212, and a timer 214. Although for simplicity FIG. 2 depicts the telephone and answering device as separate, the invention also encompasses integral telephone answering devices.

Answering device 204 connects, via a telephone line 216, to public network 218. An incoming caller places a call on a telephone 220 to telephone 202. If telephone 202 is not answered within a certain number of rings, telephone answering device 204 handles the call.

A prerecorded or preselected message is played to the caller by playback 212, typically identifying the called party and giving instructions for recording a message. Recorder 210 records the caller's message.

Recorder 210 contains a finite amount of recordable time. In the preferred embodiment, the total amount of recordable time is divided into time segments, with each segment recording one call. If the caller nears the end of a segment, the device signals the caller that time is about to run out, and inquires whether the caller would like more time.

If the caller would like more time, he enters a code by pressing a preselected sequence of one or more dual-tone multiple frequency (DTMF) keys on the keypad of telephone 220. In one embodiment, the system cues the caller, as for example instructing him to press the pound key if more time is needed. In alternatives, preferred callers have assigned codes, such as a sequence of keystrokes, that must be recognized by the processor before more time is granted. The code is recognized by checking against previously entered codes stored in memory 208. Alternatively, the response may be given by other means, such as a voice response recognized by voice-recognition software within processor 206. If the code is correctly entered, additional time is allotted for recording the message.

A method 300 describes steps applicable to a generalized voice messaging system, encompassing either a system such as that depicted in FIG. 1, or a telephone answering device such as that depicted in FIG. 2. Method 300 is shown from a point beginning after a call has been placed and the messaging system has answered the call.

The caller records the message, at a step 302. As has been discussed previously, the message has typically been prompted by the system. At a step 304, the system checks whether the message is done or the recorded time is greater than or equal to the allowed time. This check consults the timer, which tracks recorded time. The first alternative in step 304 ("the message is done") means the caller has hung up, has been silent for a preselected interval, or has otherwise indicated termination (for example, by pressing the pound key). The other alternative in step 304 means that the message has consumed the allotted interval. If either of these conditions is met, the method ends, at a step 306.

Next, the system determines whether the allowed time minus the recorded time is less than or equal to a preselected ("threshold") length of time, at a step 308. The threshold length of time is selected to give the caller enough time to make a choice before the allowed time is up.

A step 310 is optional as indicated by dashed lines. In optional step 310, the system checks to see whether the caller has been signaled. If the caller has been signaled, the method returns to step 302. In the option shown in step 310, the system allows a caller only one time extension. In alternatives, plural time extensions are permitted, and the step is omitted. Where step 310 is omitted, if the response to step 308 is "yes", the method proceeds directly to a step 312. In a third alternative, the system can allot a certain number of time extensions, in which case step 310 checks whether the caller has been signaled this number of times.

In step 312, the system asks the caller if he wishes more time. The inquiry is preferably by voice playback, but alternatively can be by signal, as for example a certain tone or pattern of tones. The system can prompt the response, or the user can have a personalized code.

At a step 314, the system checks whether the user has input a "yes" response within the allotted response time. If so, the system adds to the time allowed for this message, at a step 316.

Figure 4:
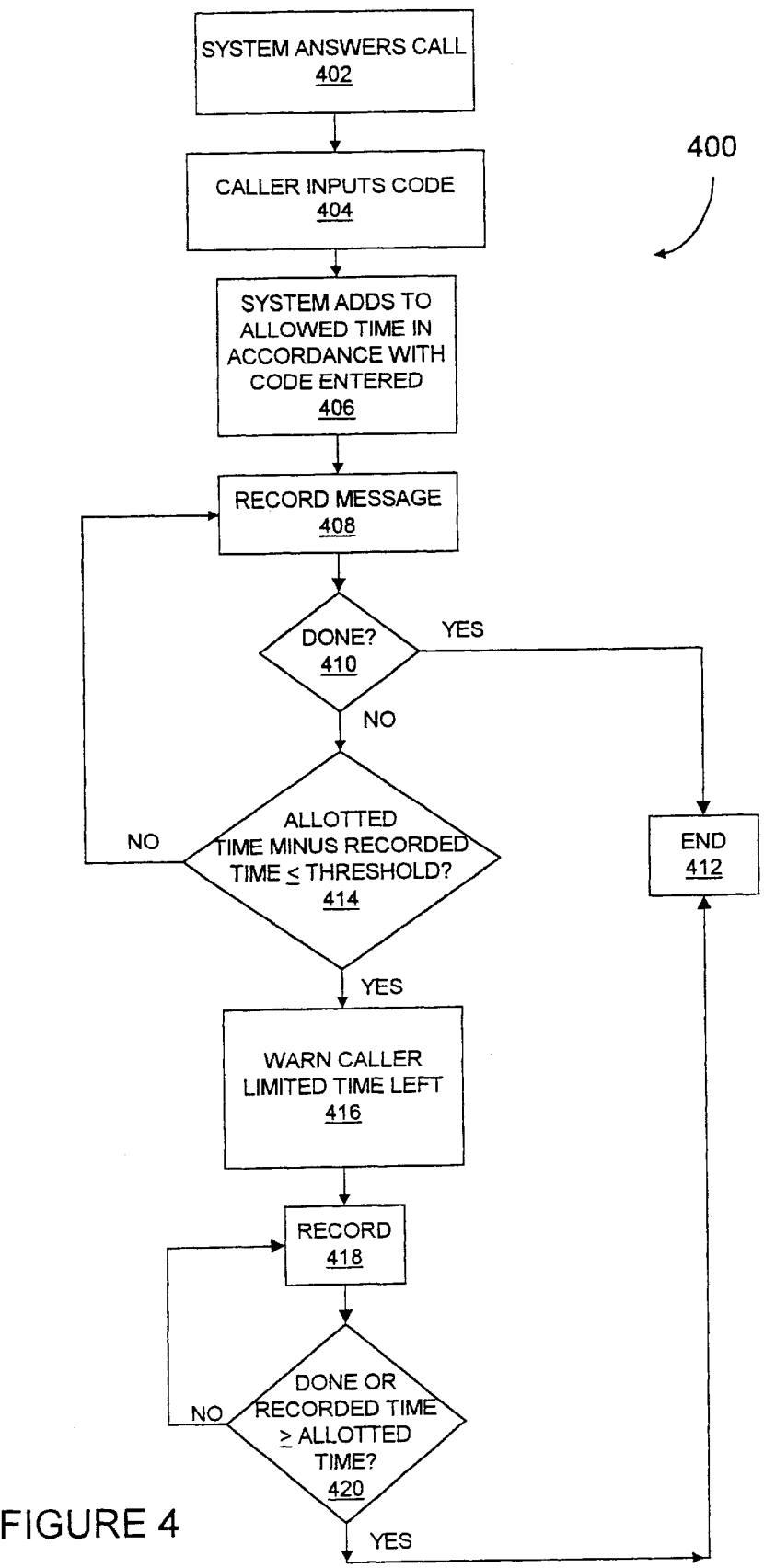
FIG. 4 shows steps of an alternative method in accordance with the present invention.

A method 400 in accordance with the present invention is shown in FIG. 4. FIG. 4 depicts an embodiment where the caller inputs a code when the system answers the call. In one embodiment, the code corresponds directly to an interval of time. For example, a caller can input one sequence of keystrokes to obtain a message length of 30 seconds, and another sequence to obtain a message length of two minutes. In an alternative embodiment, the caller inputs an identifying code. The call recipient has previously set up a correspondence of identifying codes and message length. For example, callers involved in a critical project can be given codes that allow longer than average messages. Similarly, a PBX system can allot more message time than average to key managers.

In a step 402, the system answers the call. As has been previously discussed, "the system" includes both answering machines and messaging systems such as PHONEMAIL (™). In a step 404, the caller inputs a code. In a step 406, the system adds to the allowed message time in accordance with the code entered. In a step 408, the message is recorded. At a step 410, the system checks whether the message is done. A completed message can be indicated by the caller hanging up or entering a signal such as pressing the pound key. If the call is done, the method ends, at a step 412.

If the answer to step 410 is "no", the method determines, at a step 414, whether the allowed time minus the recorded time is less than or equal to a preselected threshold. The threshold is selected to allow sufficient time for the completion of the method if the answer to step 414 is "yes". As discussed supra, in practice this step can be accomplished by comparing a readout from a timer with the allowed time.

If the answer to step 414 is no, the method returns to step 408, and the message continues to be recorded. If the answer to step 414 is yes, the method proceeds to a step 416. In step 416, the system warns the caller that the time is about to end. After step 416, the method continues recording, in a step 418. At a step 420, it is determine whether the message is finished or the recorded time is greater than or equal to the allowed time. If yes, the method ends, at step 412. If no, the method loops back to step 418.

Although the code inputting step is shown in FIG. 4 immediately after the answering step, it will be apparent to those skilled in the art that the step could occur virtually anywhere in the method before the method ends. It will also be apparent that the warning can be omitted. In that case, step 408 ("record message") proceeds directly to step 420. If the answer to 420 is yes, the method ends, at step 412. If the answer is no, the method loops back to step 408.

Figure 5:
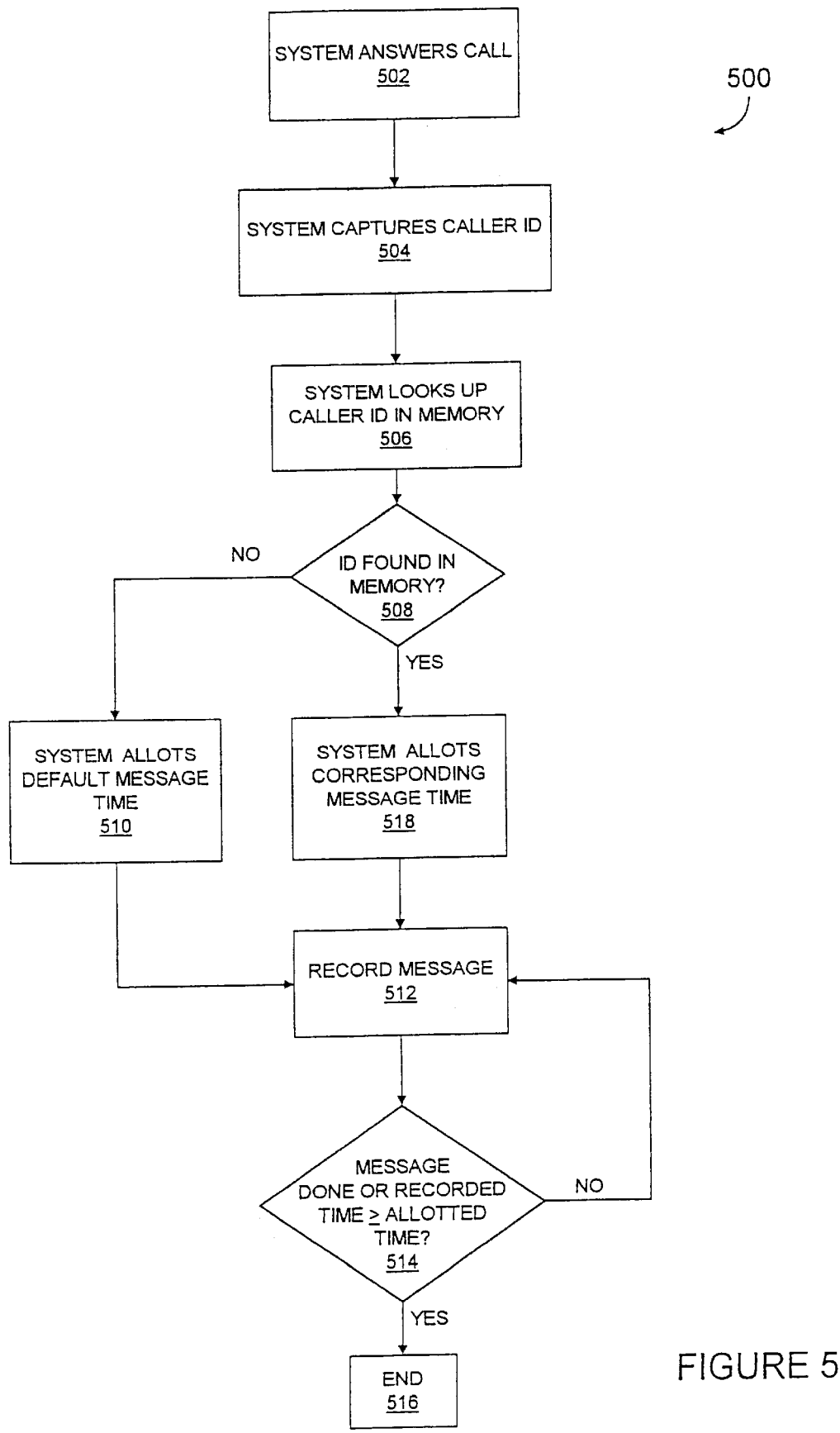
FIG. 5 shows steps of an alternative method in accordance with the present invention.

Steps of an alternative method 500 are depicted in FIG. 5. In the method shown in FIG. 5, the system automatically identifies the calling party. The caller identifications can be codes recognized by the answering system, such as public telephone caller ID, or the calling extension (as local telephone 116 of FIG. 1) in a PBX or other answering system. The call recipient has previously programmed time allotments according to the telephone numbers of expected callers. For example, the recipient can allot longer message times to important business contacts or "hot" projects.

The first step shown in method 500 is the system answering the call, at a step 502. At a step 504, the system captures the caller identification. In the method depicted in FIG. 5, the capture is automatic, without the caller inputting a code. In a step 506, the system checks the caller identification against a table stored in memory. The table lists allotted times for known caller identifications. In a step 508, the system allots the message time prescribed in the table.

At a step 510, the system records the message. At a step 512, the system determines whether the message is done or the recorded time has exceeded the allowed time. If "no", the method loops back to step 510. If "yes", the method ends at a step 514.

Figure 6:
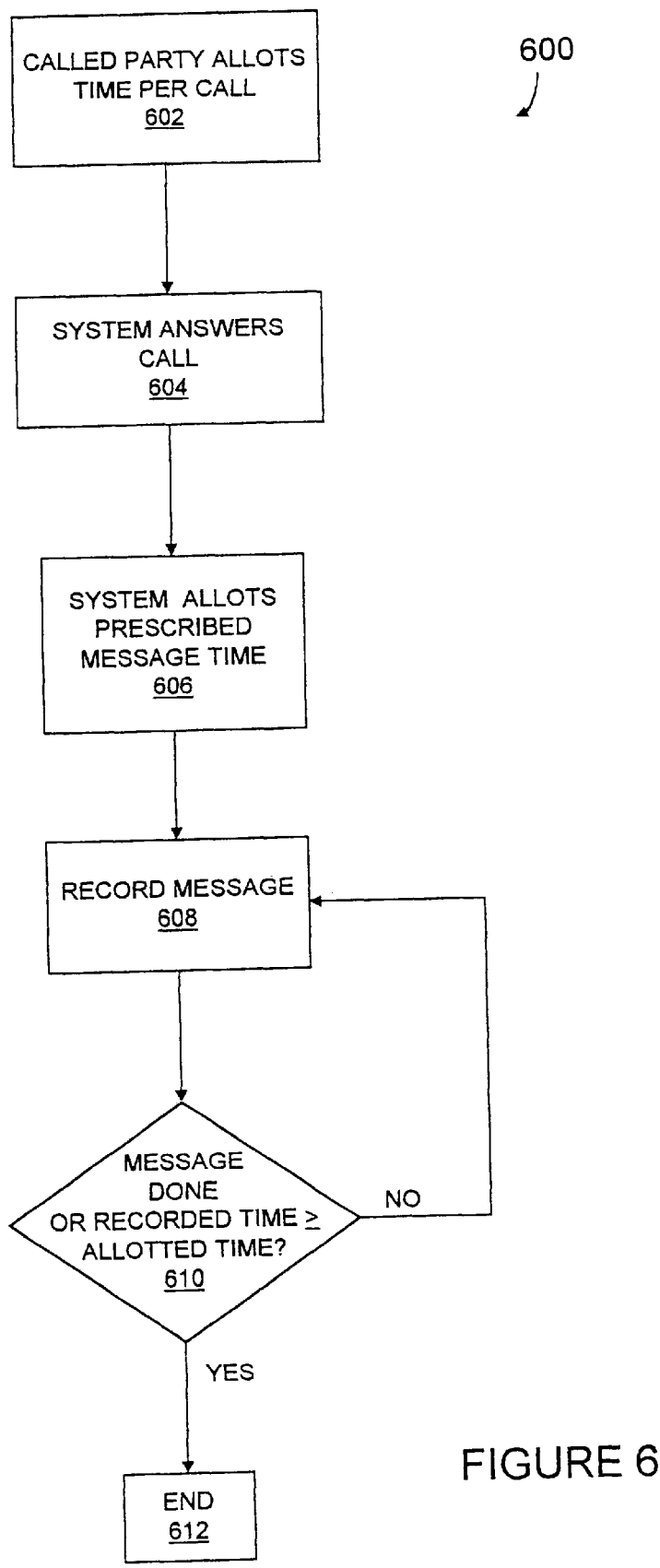
FIG. 6 shows steps of an alternative method in accordance with the present invention.

In an alternative method 600 shown in FIG. 6, the call recipient allots time per call as part of the system setup. For example, for a total message recording length of 30 minutes, the recipient can allot two minutes per call, so that his system will record 15 separate call. Alternatively, he can allot one minute per call, and record 30 separate calls. In other variations, the recipient can allot varying times per call. For example, if the recipient checks messages often, he can allot two minutes to the first ten calls and one minute to the next ten call. Accordingly, he can receive detailed messages for most calls while decreasing the chances that callers will receive "mailbox full" notifications.

In a step 602 of method 600, the called party allots time per call. In a step 604, the system answers an incoming call. In a step 606, the system allots the prescribed message time to the call. In a step 608, the system records the message. In a step 610, the system determines whether the message is done of the recorded time exceeds or is equal to the allotted time. If the answer is no, the method loops back to step 608. If the answer is "yes", the method ends, at a step 612.

The invention also encompasses facsimile transmissions. As is apparent to those skilled in the art, facsimile devices can include components such as processors, memory, storage, and timers. Facsimile devices also can include signaling systems that elicit and analyze responses from a hog device. With facsimile transmissions, it is the length of transmission that is affected by the entering of a code. The length of transmission can be defined as length of time of transmission, by number of pages, or for systems that store transmissions in a memory, by amount of storage. As discussed above, "codes" can include caller identification.

Figure 7:
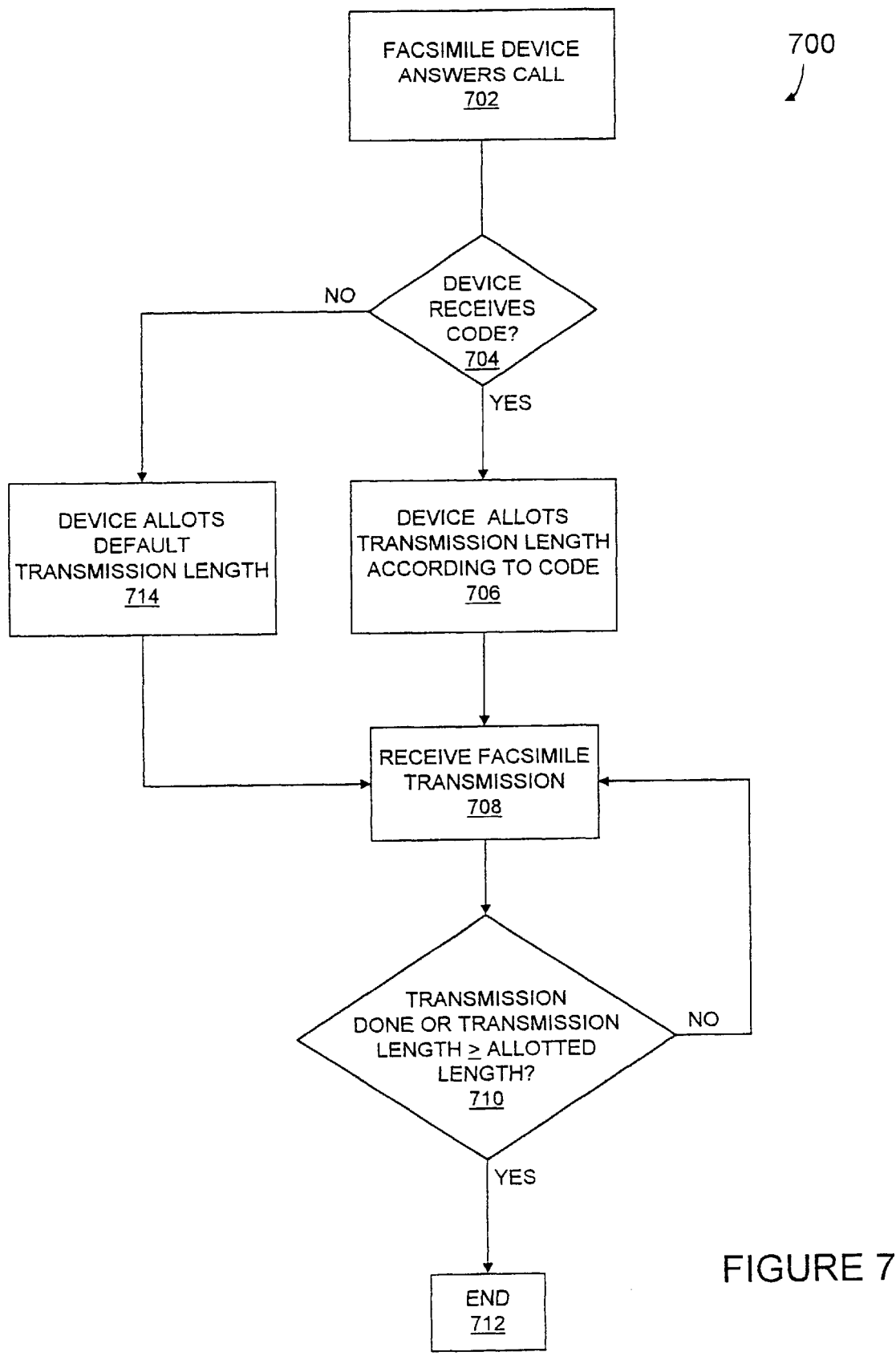
FIG. 7 shows steps of a method for use with a facsimile device.

A method 700 using a facsimile device is depicted in FIG. 7. At a step 702, the facsimile device answers the call. At a step 704, the facsimile device determines whether a preselected code has been received from the calling device. If the device has received the code, the system allots transmission length according to the received code. The method can readily be adapted from procedures described above. The device receives the facsimile transmission, at a step 708. At a step 710, the device determines whether the transmission is done or the transmission length is greater than or equal to the allotted length If the answer is "no", the method loops back to step 708, and the device continues to receive the transmission. If "yes", the method ends, at a step 712.

If, at step 704, the device does not receive the preselected code, the system allots a default transmission length, at a step 706. The method then proceeds to step 708, and follows the method from then on as described above.

Figure 8:
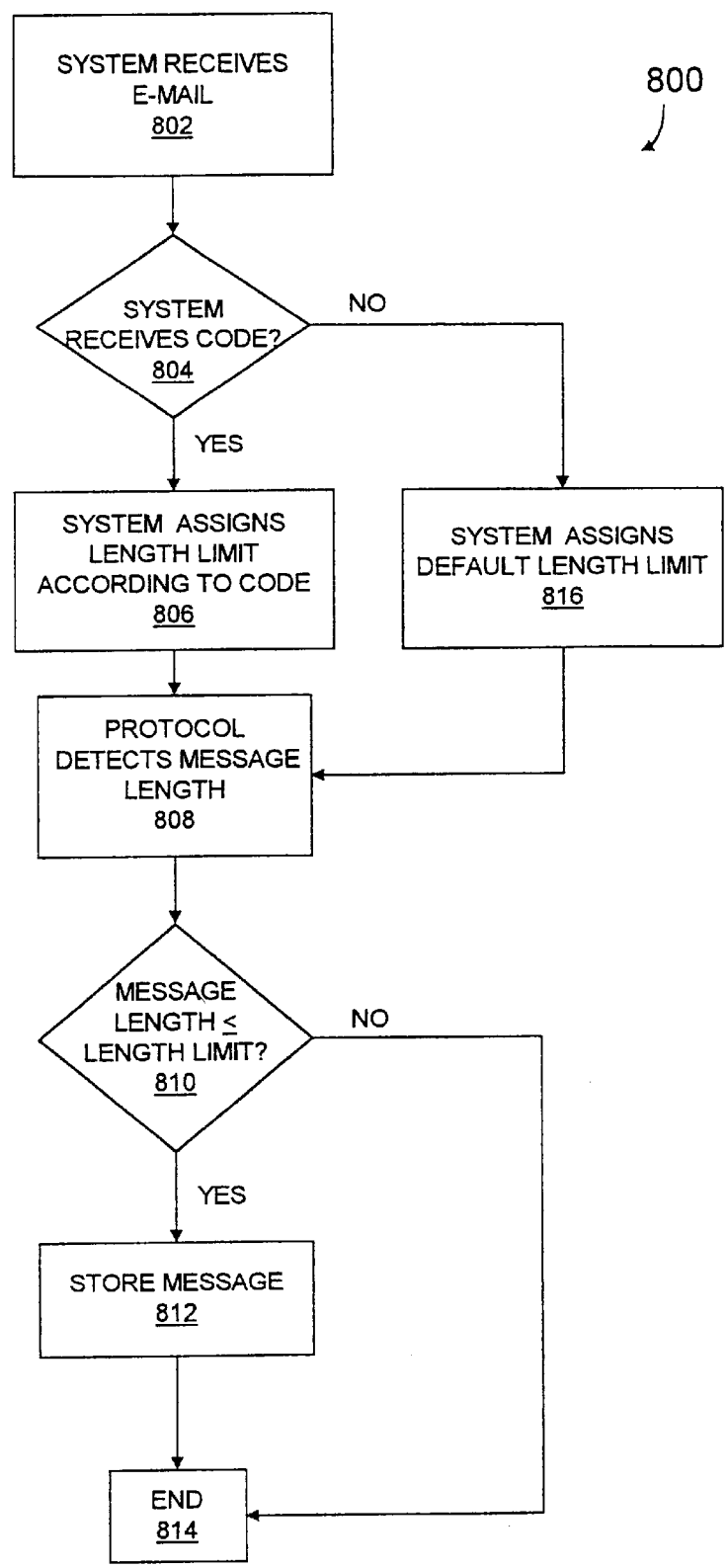
FIG. 8 shows steps of a method for use with an electronic mail system

A method 800 of the invention encompassing an electronic mail (e-mail) system is depicted in FIG. 8. As is well known to those in the art, such systems include processors, memory, recorders, timers, storage, and display. At a step 802, an electronic mail system receives an e-mail transmission. At a step 804, the system determines whether a preselected code has been received from the e-mail source. If the recipient system has received the code, the system assigns an e-mail length limit according to the received code. The method can readily be adapted from procedures described above.

The system protocol detects the e-mail message length, at a step 808. At a step 810, the system determines whether the detected message length is within the length limit. If within the limit, the system stores the message at a step 812. The method then ends, at a step 814. If at step 810 the system determines that the message length is not within the limit, the method proceeds directly to step 814 and ends.

The codes in method 800 include automatic system recognition of the sender's identification, as for example, by e-mail address, as well as codes entered by the sender. Although restricting length of e-mail transmissions has not been an overriding concern for the average e-mail user, e-mail is increasingly being used for image data and even video transmissions, which can be large. Lengthy unwanted e-mail transmissions ("spamming") can also be a problem.

Modifications to and variations on the invention will be apparent to those skilled in the art. "Call recipient" or "person called" in all places in this specification also encompasses people who are not the person called, but who manage telephone systems. For example, a manager could configure the message systems of his employees, or a parent could configure the answering machine options of his teenage child.

The message timer can be used in an asynchronous system to trigger an interrupt of the recording. The code need not be by input DTMF tones or keystroke sequence. For example, voice recognition software can recognize a spoken response or even identify the speaker by voice. Variations in the precise order of steps will be apparent to those skilled in the art. The methods may be combined with other steps known in the art, such as notification that the message time is about to run out. The methods are not mutually exclusive; steps from one embodiment can be combined with steps from another, as will be apparent to those skilled in the art. Although the embodiments discussed generally concern a preselected code adding message time to the allotted time, the invention also encompasses systems in which receiving a preselected signal causes the system to shorten the allotted time. The methods are compatible with numerous messaging system technologies, including store-and-forward systems and public network-affiliated messaging systems, such as Pacific Bell's MESSAGE CENTER (™).

The invention is also compatible with computer messaging systems. Codes can be entered by sequences of keyboard strokes, or by computer commands. The scope of the invention is limited only by the following claims.

What is claimed is:

1. A messaging system for recording messages from a caller to a call recipient comprising:
   a data processor;
   a recording apparatus for recording messages in said messaging system, the length of recording time for said messages being controlled by said data processor; and
   a data input for enabling the caller to input a code selected from a set of plural codes to said data processor for leaving a message for the call recipient, wherein if a first preselected code is input, said data processor sets the length of the message recording time to a first maximum recording time and if a second code is input, said data processor sets the length of the message recording time to a second maximum recording time.

2. The system of claim 1 further comprising a telephone answering device.

3. The system of claim 1 further including more than two codes and more than two maximum times.

4. The system of claim 1 wherein the code is input by automatic capture by the call recipient of caller identification.

5. A messaging system for recording messages from a caller to a call recipient comprising:
   a data processor;
   a recording apparatus for recording messages in said messaging system, the length of recording time for said messages being controlled by said data processor; and a data input for enabling said caller to input a code selected from a set of plural codes to said data processor for leaving a message for the call recipient;

wherein, if a first preselected code is input, said code programs said data processor to set the length of the message recording time to a first maximum recording time and if a second code is input, said data processor sets the length of the message recording time to a second maximum recording time.

6. The system of claim 5 further comprising a telephone answering device.

7. In a voice messaging system for recording messages from a caller to a call recipient, a method of taking messages comprising the following steps:

setting an allotted time for recording a message;

receiving a message; and if the system receives a first preselected code after a call has been initiated from the caller to the call recipient, adding a first maximum allowed recording time to said allotted time, and if the system receives a second preselected code after a call has been initiated from the caller to the call recipient, adding a second maximum allowed recording time to said allotted time.

8. The system of claim 7, wherein the preselected code is transmitted by a calling party.

9. The system of claim 8, wherein the transmitted code is cued by the system.

10. The system of claim 7, wherein the preselected signal is a captured identifier recognized by the system.

11. The system of claim 7, wherein said preselected signal is received before said message is recorded.

12. The system of claim 7, wherein said code is entered by a sequence of keypad keystrokes.

13. The system of claim 7, wherein said code is entered by a sequence of keyboard keystrokes.

14. A system for receiving facsimile transmissions comprising:

a data processor; and a recording apparatus for recording facsimile transmissions, the length of recording for said facsimiles being controlled by said data processor, wherein when a code is input, said data processor looks up information corresponding to said code in a memory and sets a maximum amount of data to be recorded in accordance with said information, wherein said data is selected from a group consisting of length of time, number of pages, and amount of storage.

15. The system of claim 14 wherein said recording apparatus is a memory, and said length of recording is an amount of storage.

16. The system of claim 14 wherein said recording apparatus is paper.

17. The system of claim 14 further including a second code that sets a second maximum allowed amount of data to be recorded.

* * * * *